United States Patent
Huang et al.

(10) Patent No.: US 12,398,443 B2
(45) Date of Patent: Aug. 26, 2025

(54) PROCESS FOR METALLURGY AND SEPARATING RARE EARTH CONCENTRATE USING COMBINATION METHOD

(71) Applicant: GRIREM ADVANCED MATERIALS CO., LTD., Beijing (CN)

(72) Inventors: Xiaowei Huang, Beijing (CN); Zongyu Feng, Beijing (CN); Xu Sun, Beijing (CN); Yang Xu, Beijing (CN); Meng Wang, Beijing (CN); Liangshi Wang, Beijing (CN); Chao Xia, Beijing (CN); Xiangsheng Liu, Beijing (CN); Longsheng Zhao, Beijing (CN); Yongqi Zhang, Beijing (CN)

(73) Assignee: GRIREM ADVANCED MATERIALS CO., LTD., Beijing (CN)

( * ) Notice: Subject to any disclaimer, the term of this patent is extended or adjusted under 35 U.S.C. 154(b) by 993 days.

(21) Appl. No.: 17/267,481

(22) PCT Filed: Aug. 9, 2019

(86) PCT No.: PCT/CN2019/099932
§ 371 (c)(1),
(2) Date: Feb. 9, 2021

(87) PCT Pub. No.: WO2020/030084
PCT Pub. Date: Feb. 13, 2020

(65) Prior Publication Data
US 2021/0310100 A1     Oct. 7, 2021

(30) Foreign Application Priority Data
Aug. 10, 2018  (CN) .......................... 201810912079.3

(51) Int. Cl.
| C22B 59/00 | (2006.01) |
| C22B 1/02  | (2006.01) |
| C22B 3/10  | (2006.01) |

(52) U.S. Cl.
CPC ................ *C22B 59/00* (2013.01); *C22B 1/02* (2013.01); *C22B 3/10* (2013.01)

(58) Field of Classification Search
CPC .. C22B 59/00; C22B 1/02; C22B 3/10; C22B 1/06
See application file for complete search history.

(56) References Cited

U.S. PATENT DOCUMENTS

| 9,328,399 B2* | 5/2016 | Ozaki ........................ C01F 5/40 |
| 2012/0027651 A1* | 2/2012 | Otto .......................... H01J 9/52 |
| | | 423/21.1 |

FOREIGN PATENT DOCUMENTS

| CN | 1721559 A | 1/2006 |
| CN | 101363079 A | 2/2009 |

(Continued)

OTHER PUBLICATIONS

Farzaneh Sadri et al. ["A review on the cracking, baking and leaching processes of rare earth element concentrates", Journal of Rare Earths, vol. 35, No. 8, Aug. 2017, p. 739]. (Year: 2017).*

(Continued)

*Primary Examiner* — Sally A Merkling
*Assistant Examiner* — Nazmun Nahar Shams
(74) *Attorney, Agent, or Firm* — Westbridge IP LLC (57) ABSTRACT

The present invention provides a process for metallurgy and separating a rare earth concentrate using a combination method, the process including: treating the rare earth concentrate containing bastnaesite by using a method including roasting under an atmosphere, leaching with hydrochloric acids, and roasting with a sulfuric acid, wherein stepping (Continued)

acid leaching with low-concentration hydrochloric acids is controlled during the leaching with the hydrochloric acids so as to obtain a rare earth solution with a high concentration (150-250 g/L REO), such that a leaching rate of Ce reaches 60% or more, and the content of F in a leaching liquor is reduced by aging; and rare earth is further recovered from a leach residue by roasting with the sulfuric acid and leaching with water, and the total yield of the rare earth reaches 95% or more.

14 Claims, 1 Drawing Sheet

(56) References Cited

FOREIGN PATENT DOCUMENTS

| | | | |
|---|---|---|---|
| CN | 102146512 A | 8/2011 | |
| CN | 101683998 B | 2/2012 | |
| CN | 102399975 A | 4/2012 | |
| CN | 102876889 A | 1/2013 | |
| CN | 103045851 A | 4/2013 | |
| CN | 103374652 A | 10/2013 | |
| CN | 103397213 A | 11/2013 | |
| CN | 104862502 A | 8/2015 | |
| CN | 106636614 A | 5/2017 | |
| CN | 108165732 A | 6/2018 | |
| CN | 10913659 A | 1/2019 | |
| JP | 2017014605 A | 1/2017 | |
| WO | 2009021389 A1 | 2/2009 | |

OTHER PUBLICATIONS

Li et al. ["Effect of oxidation behavior of cerium during the roasting process on the leaching of mixed rare earth concentrate", Hydrometallurgy 174 (2017) 156-166]. (Year: 2017).*

Ganzhou Jisheng Tech. Co. Ltd. [CN105256156B] (Machine translation)] (Year: 2017).*

International Search Report of PCT/CN2019/099932.

Written Opinion of PCT/CN2019/099932.

Kyang, Qingshan et al.). "(Study on New Smelting Process of Bastnaesite)" (Rare Metals and Cemented Carbides), vol. 42, No. (1), Feb. 28, 2014 (Feb. 28, 2014), ISSN: 1004-0536.

Yang et al., Study on New Smelting Process of Bastnaesite, Rare Metals and Cemented Carbides, 2014, 42(1), pp. 1-4, dated Feb. 28, 2014.

* cited by examiner

PROCESS FOR METALLURGY AND SEPARATING RARE EARTH CONCENTRATE USING COMBINATION METHOD

CROSS-REFERENCE TO RELATED APPLICATIONS

The present application is a national stage application filed based on and claims priorities to Chinese patent application No. CN201810912079.3 filed on Aug. 10, 2018 and PCT Application No. PCT/CN2019/099932 filed on Aug. 9, 2019, the content of which is incorporated herein in the entirety by reference.

TECHNICAL FIELD

The present invention belongs to the field of rare earth metallurgy and separating technologies, and particularly relates to a process for metallurgy and separating a rare earth concentrate using a combination method. The process is suitable for bastnaesite, as well as mixed rare earth minerals of bastnaesite and one or more of such rare earth minerals as monazite, xenotime and apatite.

BACKGROUND

China's rare earth resources are mainly light rare earth mineral resources, accounting for more than 90% of the total reserves. However, industrial rare earth minerals are mainly bastnaesite and monazite, containing light rare earth as high as 96% to 98%. According to statistics, light rare earth deposits with industrial application values are mainly Bayan Obo mixed rare earth concentrate in Baotou, Panxi Mianning bastnaesite in Sichuan and Weishan bastnaesite in Shandong.

At present, about 90% of mixed rare earth concentrate in Baotou is treated using the third-generation patented sulfuric acid method developed by the General Research Institute for Nonferrous Metals (GRINM), i.e., roasting for decomposition enhanced by a concentrated sulfuric acid, leaching with water, neutralization for impurity removal, and precipitation with ammonium bicarbonate and dissolution with a hydrochloric acid or P507 and P204 transformation and separation by extraction. This process is simple and controllable, facilitates continuous large-scale production, and is high in a recovery rate of rare earth, and it demands not much on the grade of rare earth concentrate and is lower in operating cost. However, during the roasting enhanced by the sulfuric acid, complex tail gas containing sulfur and fluorine is generated, resulting in very difficult recycling and treatment and a high equipment investment. As a result, the overall operating cost is increased.

Bastnaesite generally adopts a chemical treatment process of oxidizing roasting and leaching with a hydrochloric acid (HCl), and its concentrate generates a rare earth oxide, a rare earth fluoride or a rare earth oxyfluoride soluble in a hydrochloric acid by means of oxidizing roasting decomposition. Cerium(III) is oxidized to Cerium(IV), and during leaching with a hydrochloric acid, trivalent rare earth is leached to obtain a cerium-poor rare earth chloride. Cerium (IV) and a part of trivalent rare earth, fluorine and thorium remain in HCl leaching residue, and defluorination is performed on the HCl leaching residue by means of alkali decomposition to obtain cerium-rich residue that can be used for producing a ferro-silicon alloy, or reduction leaching is performed on the cerium-rich residue to produce a cerium oxide with a purity about 98%. The cerium-poor rare earth chloride is separated into single rare earth by a P507 extractant. This process has the advantages of low investment and relatively low production cost, but its disadvantage is that the process is discontinuous, insoluble cerium, thorium and fluorine remain in the residue during the leaching with the hydrochloric acid, and after the residue is subjected to alkali conversion, fluorine enters waste water in the form of sodium fluoride while thorium and fluorine are dispersed in the residue and waste water and thus are difficult to recycle. As a result, not only does the entire process pollute the environment, but also the recycling purity of cerium is only about 98%, leading to a low value in use.

In recent years, with gradual improvement of domestic environmental protection laws and regulations, emission standards of pollutants from the rare earth industry have become increasingly strict in various regions. The Ministry of Environmental Protection promulgated the world's first "*Emission Standards of Pollutants from Rare Earth Industry*" (GB26451-2011) on Jan. 24, 2011, setting explicit requirements for emission limits, monitor and control of water and air pollutants by production facilities of existing and newly-built rare earth industrial enterprises. On May 10, 2011, "*Several Opinions of the State Council on Promoting the Sustainable and Healthy Development of the Rare Earth Industry* (12 [2011] *promulgated by the State Council*" was issued. The new "*Environmental Protection Law of People' Republic of China*", which came into effect on Jan. 1, 2015, clearly stipulates the implementation of a total emission control system for key pollutants in key industries. In October 2016, the Ministry of Industry and Information Technology issued the "*Development Plan for Rare Earth Industry (2016-2020)*", which made clear requirements for the production indicators and green development indicators of the rare earth industry during the "13$^{th}$ Five-Year Plan". These above-mentioned national policies have great strategic significance for the pollution control of rare earth production, and the rare earth industry also has imperious demands for brand-new environmentally friendly metallurgy and separating technologies.

SUMMARY

To solve the problems of the existing bastnaesite treatment process that a leaching liquor of hydrochloric acid is low in content of Ce and a cerium oxide obtained by recycling cerium-rich residue is low in purity, and to solve the problems of the mixed concentrate treatment process that fluorine is contained during roasting with a sulfuric acid, the emission of flue gas containing fluorine and sulfur is high, the treatment and recovery cost is high and a leaching liquor of rare earth is low in concentration, the present invention provides a process for metallurgy and separating a rare earth concentrate using a combination method, the process including:

(1) decomposing the rare earth concentrate by roasting under a certain roasting atmosphere to obtain a roasted concentrate;

(2) adding the roasted concentrate with a hydrochloric acid to leach rare earth, and collecting a leaching liquor of rare earth and a leach residue respectively after solid-liquid separation; and (3) dehydrating the leach residue, then adding the dehydrated leach residue with a concentrated sulfuric acid, roasting, collecting a roasted product, leaching the roasted product with water, and neutralizing to remove impurities so as to obtain a rare earth sulfate solution.

Preferably, the rare earth concentrate includes, but is not limited to, bastnaesite or a mixed rare earth mineral of bastnaesite and one or more of monazite and xenotime.

In step (1), the roasting atmosphere during the roasting includes a water vapor atmosphere or a weakly oxidizing atmosphere; the weakly oxidizing atmosphere includes, but is not limited to, one or more of $N_2$, CO, $CO_2$, air, and inert gases, and the content of oxygen may be reduced by controlling the intake of gas; the water vapor atmosphere is for the purpose of defluorination so as to obtain pure hydrogen fluoride (HF) as a recovery product; and the weakly oxidizing atmosphere is for the purposes of reducing the oxidation rate of cerium and improving the leaching yield of the rare earth.

In step (1), the HF gas obtained after defluorination is adsorbed for recovery by a rare earth oxide or a rare earth hydrated oxide to obtain a fluorinated rare earth product, and its principle is that the rare earth oxide forms a polynuclear hydroxyl compound in water, so that ion exchange occurs between OH and fluoride ions on the polynuclear hydroxyl compound in water to achieve a double defluorination effect. Through recovery by adsorption, HF produced during the defluorination, roasting and decomposition of the rare earth concentrate can be effectively recovered to obtain the fluorinated rare earth product, realizing standard emission of tail gas, which has a significant benefit of environmental protection.

In step (1), the roasting is at a roasting temperature of 350° C. to 650° C., preferably 400° C. to 600° C., and the leaching rate of the rare earth can be increased when the roasting temperature is increased within a certain range. The roasting step lasts for 0.5 h to 6 h, and the leaching rate can be increased when the roasting time is prolonged within a certain range.

In the process according to the present invention, the roasting of the rare earth concentrate is mainly decomposition of $RECO_3F$ in the concentrate, and its reaction formula is $REFCO_3=REOF(CeOF)+CO_2\uparrow$. In the presence of water vapor, defluorination occurs, and its reaction formula is $REOF+H_2O=RE_2O_3+HF\uparrow$. Fluorine is recovered from the escaped HF gas by means of such an adsorbent as a rare earth oxide, and its reaction formula is $6HF\uparrow + RE_2O_3 = 2REF_3 + 3H_2O$.

In step (2), the concentration of the hydrochloric acid is 3-10 mol/L, preferably 4-7 mol/L, and the use ratio of the hydrochloric acid to the roasted concentrate is 0.4-2.0 mol of the hydrochloric acid/100 g of the rare earth concentrate, preferably 0.7-1.5 mol of the hydrochloric acid/100 g of the rare earth concentrate.

In step (2), the leaching with the hydrochloric acid preferably includes two or more steps of countercurrent leaching with hydrochloric acids; in the first step, solid-liquid separation is performed after leaching with the hydrochloric acid to obtain a first-step leaching liquor of rare earth and a first-step leach residue; next, the first-step leach residue is leached with the hydrochloric acid, and solid-liquid separation is performed to obtain a second-step leaching liquor of rare earth and a second-step leach residue; the second-step leaching liquor of rare earth is returned to be used as bottom water for leaching with the hydrochloric acid in the previous step; and next, the second-step leach residue is leached with the hydrochloric acid.

In step (2), the hydrochloric acids are added in the way that 2 to 5 stages of continuous cocurrent leaching are carried out during the leaching, and are controlled to be added in a concentration gradient during each stage of leaching. That is, the hydrochloric acid with a lower concentration is added in the first stage and the hydrochloric acids with higher concentrations are added in the later stages to keep the acidity of a mixed solution at 0.01-0.6 mol/L, preferably 0.05-0.3 mol/L. The lower the acidity is, the better for leaching of rare earth is. The objective is to ensure that tetravalent Ce is not reduced after entering the solution, and to increase the leaching rates of both the rare earth and fluorine. Through the stepping leaching, a higher concentration of rare earth may be acquired, and the concentration of rare earth in a leaching liquor reaches 150-250 g/L. Meanwhile, because the content of residual acid in the leaching liquor is effectively reduced, the consumption of a neutralizer in subsequent processes is reduced accordingly.

In the process of leaching the roasted concentrate with the hydrochloric acid, leaching with the hydrochloric acid is carried out at a lower temperature because F is mainly present in the solution in the form of a $[CeFx]^{4-x}$ coordination complex. The low temperature is conducive to a steady state of the $[CeFx]^{4-x}$ coordination complex, such that more rare earth and F may be dissolved out, and the leaching rate of the rare earth reaches 70% to 95%.

The leaching temperature during the leaching with the hydrochloric acid is controlled to be 10° C. to 75° C., preferably 20° C. to 65° C., and the total reaction time is controlled to be 0.5 h to 10 h, preferably 1 h to 6 h, mainly for increasing the leaching rate of the rare earth and F.

In step (3), the dehydration is performed by means of natural drying and/or drying. Preferably, the moisture content of the dehydrated leach residue after the treatment is less than 10%, and the dehydrated leach residue contains 20% to 60% of an REO (Rare Earth Oxide), mainly $REPO_4$, which may be mixed with other rare earth concentrates for roasting with a sulfuric acid.

In step (3), the mass ratio (w/w) of the concentrated sulfuric acid to the dehydrated leach residue is (0.3 to 1.2):1, preferably 0.5:1. Compared with the prior art, the solution of the present invention has the advantages that a large amount of rare earth is leached in steps 1 and 2, and the consumption of the sulfuric acid during the roasting with the sulfuric acid is greatly reduced.

In step (3), the roasting with the sulfuric acid is at a temperature of 200° C. to 450° C., preferably 200° C. to 220° C. or 250° C. to 350° C., and the roasting step lasts for 1 h to 4 h.

The leaching with water is at a temperature of 20° C. to 50° C., preferably 25° C. to 40° C., and it preferably lasts for 2 h to 5 h. Preferably, the leaching liquor may be neutralized with an alkaline substance to have a pH of 4 to 4.5, and the concentration of the obtained rare earth sulfate solution is 25-45 g/L (REO).

In step (3), the leach residue of hydrochloric acid is first washed with water, and the ratio (w/w) of washing water to the leach residue is controlled to be (0.5 to 10):1, preferably (0.5 to 5):1. The moisture content of the dried leach residue is 0-50%, preferably 0-30%. In the treated washing water, the concentration of the rare earth is 5-50 g/L (REO) and the concentration of $H^+$ is less than 0.1 mol/L. The objective of washing with water is to wash rare earth chloride entrained in the leach residue into the solution to further increase the leaching rate of rare earth, and to remove chloride ions that may corrode a subsequent sulfating roasting device. A certain degree of dehydration may reduce dilution of a concentrated sulfuric acid during enhanced roasting with the sulfuric acid, and a water washing liquid is reused for size mixing of the rare earth concentrate or preparation of the hydrochloric acid in step (2) to realize closed-loop circulation.

Step (3) further includes a step of adding the obtained rare earth sulfate solution with iron powder for preparation, wherein the addition of the iron powder is 2% to 10% of the mass of the leach residue of the hydrochloric acid.

Step (3) further includes a step of transforming the obtained rare earth sulfate solution by extraction to obtain a rare earth chloride solution, and separating the rare earth chloride solution by extraction to obtain a single rare earth compound.

The transforming by extraction step is to transform by means of precipitation or extraction.

Step (2) further includes a step of aging the leaching liquor of the rare earth and performing solid-liquid separation to obtain a rare earth chloride solution and a fluorinated rare earth product; and combining the obtained rare earth chloride solution with the rare earth chloride solution obtained by transforming the rare earth sulfate solution, and separating by extraction to obtain a single rare earth compound.

The aging step is performed under a standing or stirring condition, and filtering is performed to obtain a lanthanum cerium fluoride product. The aging is controlled to be performed at a temperature of 60° C. to 90° C., preferably 65° C. to 80° C. The temperature of the aging should be preferably controlled to be equal to or higher than the temperature of leaching with the hydrochloric acid. The aging step lasts for 0.5 h to 10 h, preferably 1 h to 4 h.

Since F in the leaching liquor is present in the solution mainly in the form of a $[CeFx]^{4-x}$ coordination complex, and an electrode potential of $Cl_2/Cl^-$ decreases with increase of temperature and is significantly lower than that of $Ce^{4+}/Ce^{3+}$, the formed $[CeFx]^{4-x}$ coordination complex is reduced by $Cl^-$ and releases $F^-$. The generated F-immediately binds to $RE^{3+}$ (mainly Ce around F ions) to form a precipitate of rare earth fluoride. In addition, the solubility product of the rare earth fluoride is inversely correlated with the temperature. The higher the temperature is, the lower the solubility product is, for example $CeF_3$, 25° C., Ksp=$8.0\times10^{-16}$; 100° C., Ksp=$9.3\times10^{-18}$, which further promotes precipitation of the rare earth fluoride. In this way, high-temperature aging is used in the process of the present invention, and can effectively separate F from the leaching liquor to enable F to enter the residue. The content of F in the leaching liquor is less than 8 mg/L. Increasing the aging temperature and prolonging the aging time can further reduce the content of F and prevent F from adversely affecting the subsequent separation by extraction.

In this step, the precipitate of rare earth fluoride may be obtained by the aging, and it is preferred that F in the leaching liquor is controlled to be less than 8 mg/L, preferably less than 2 mg/L. The residual amount of F in the leach residue obtained by the solid-liquid separation in step (2) accounts for less than 5%, preferably less than 1%, of the content of F in the rare earth concentrate. In the rare earth chloride solution obtained after the aging and filtering, the concentration of the rare earth is 150-250 g/L (REO), the leaching rate of the rare earth is 70% to 95%, and the leaching rate of Ce is 60% to 95%. The following Table 1 shows the comparison of the leaching liquor of the hydrochloric acid obtained by this process and a traditional bastnaesite treatment method. It can be seen that the concentration of the leaching liquor, the total leaching rate of rare earth and the leaching rate of Ce, obtained by this process are higher than those obtained by the traditional bastnaesite treatment method, the concentration of $H^+$ in the leaching liquor is lower, and the leaching liquor almost does not contain F, achieving obvious technical advantages.

TABLE 1

Comparison of Leaching Liquor of Hydrochloric Acid Obtained by this Process and Traditional Bastnasite Treatment method

| | Concentration of leaching liquor (REO g/L) | Total leaching rate of rare earth (%) | Leaching rate of Ce (%) | Concentration of $H^+$ in leaching liquor (mol/L) |
|---|---|---|---|---|
| Traditional bastnaesite treatment method | ~150 | <50 | <20 | 0.2-0.3 |
| This process | 150-250 | 70%-95% | 60%-95% | <0.1 |

The process for metallurgy and separating the rare earth concentrate by the combination method further includes: spraying fluorine-containing tail gas generated in the step (1) with water or an alkaline liquid, or performing defluorination on the fluorine-containing tail gas using one or two adsorbents of a rare earth oxide and a rare earth hydrated oxide to recover a rare earth fluoride product; and/or, desulfurizing and recycling sulfur-containing tail gas generated in step (3) to obtain a sulfuric acid product.

After the sulfur-containing tail gas generated during the roasting with the sulfuric acid is subjected to desulfurization and recovery, not only the emission of tail gas meets the standards, but also a high-purity sulfuric acid product can be recovered and the concentration can reach more than 80%, effectively solving the problems of a traditional process that tail gas contains F, corrosive loss of devices is severe, F and S-containing substances are difficult to separate, standard treatment is not easy, and the running cost is high.

The present invention provides a process for metallurgy and separating a rare earth concentrate using a combination method. The process includes: treating the rare earth concentrate containing bastnaesite by using a method including roasting under an atmosphere, leaching with hydrochloric acids and roasting with a sulfuric acid, wherein stepping acid leaching with the low-concentration hydrochloric acids during the leaching with the hydrochloric acids is controlled to obtain a rare earth solution with a higher concentration (150-250 g/L REO). Meanwhile, owing to the characteristics of the $[CeFx]^{4-x}$ coordination complex, more Ce enters the solution, such that the leaching rate of Ce reaches 60% to 95%, and the total leading rate of rare earth reaches 70% to 95%. Furthermore, owing to the reducibility of $Cl^-$ and the relationship between the solubility product of the rare earth fluoride and the temperature, the process further reduces the content of F in the leaching liquor by means of high-temperature aging. Compared with a traditional bastnaesite treatment process including oxidizing roasting and leaching with a hydrochloric acid, the process provided by the present invention has the advantages that both the concentration of the leaching liquor and the leaching rate of rare earth are greatly improved, a step in the traditional process that further evaporation and concentration are required for acquiring the high-concentration rare earth chloride solution is eliminated. In addition, since the content of F in the solution is very low, F is prevented from entering an extracting system to generate three phases, and may directly enter a P507-HCl system to be separated, such that a single rare earth element can be purified.

According to the process for metallurgy and separating the rare earth concentrate by the combination method, after the rare earth concentrate is roasted under an atmosphere, leached with a hydrochloric acid, and aged at a high temperature, only 5% to 30% of rare earths remains in the leach residue of the hydrochloric acid. Compared with the traditional process for processing a mixed rare earth concentrate, the process provided by the present invention greatly reduces the consumption of a concentrated sulfuric acid, and meanwhile, greatly reduces the consumption of water during the leaching with water. Since 70% to 95% of rare earth directly enters a chlorination system to separate rare earth by extraction, the consumption of acid and alkaline in transforming the leaching liquor of sulfuric acid into a rare earth chloride solution by extraction is greatly reduced.

In the process for metallurgy and separating the rare earth concentrate by the combination method, the trend of fluorine is effectively controlled. First, during the roasting under an atmospheric, most fluorine is converted into HF gas to enter the tail gas, and the fluorine-containing product is prepared by means of adsorption and recovery. Second, during the leaching with the hydrochloric acid, a small amount of fluorine is leached into the rare earth chloride solution, and the fluorinated rare earth product is obtained by means of aging, such that the concentration of F in the rare earth chloride solution is less than 8 mg/L, and fluorine is prevented from entering the leach residue. Thus, the problem that the fluorine-containing and sulfur-containing mixed tail gas during the roasting with the sulfuric acid is difficult to process is solved. As the amount of rare earth remaining in the leach residue of the hydrochloric acid is greatly reduced, the consumption of the concentrated sulfuric acid used during the roasting with the sulfuric acid is also reduced, and the emission of $SO_2$ flue gas generated during the roasting with the sulfuric acid is also reduced by more than 60%, the waste gas and wastewater treatment cost is greatly reduced. The process is closer to the objective of cleaner production, is eco-friendly, and has significant economic and environmental advantages as a whole. The effective recovery and treatment of F also solves the problem that due to a large amount of F-containing wastewater in a traditional process, it is difficult for the treatment to meet standards. The whole process has a wider industrial applicability, can comprehensively treat a variety of complex rare earth minerals, and can realize environmentally friendly, efficient and clean production of such mineral-type rare earth concentrates as Baotou mixed rare earth concentrate and bastnaesite, achieving significant economic and social benefits.

BRIEF DESCRIPTION OF THE DRAWINGS

To make the content of the present invention easier to understand clearly, the present invention will be further described in detail based on the specific embodiments of the present invention and the accompanying drawings.

DETAILED DESCRIPTION

Embodiment 1

Figure 1:
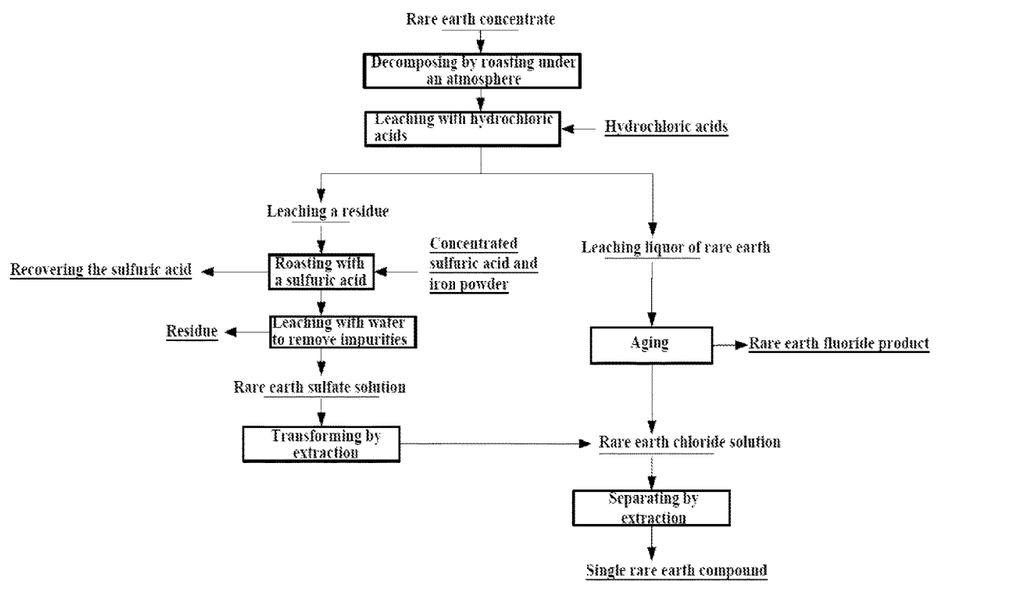
FIG. 1 is a flow diagram of a process for metallurgy and separating a rare earth concentrate by a combination method according to the present invention.

The rare earth concentrate processed by the process described in this embodiment is a bastnaesite and monazite mixed rare earth concentrate. According to the process flow diagram shown in FIG. 1, the process for metallurgy and separating the rare earth concentrate by the combination method includes the following steps.

(1) The bastnaesite and monazite mixed rare earth concentrate is roasted under an air atmosphere (the content of oxygen is 21%) at 500° C. for 4 h to obtain a roasted concentrate.

In this step, HF that escapes during the roasting is sprayed with water.

(2) The obtained roasted concentrate is added with hydrochloric acids and subjected to 4 stages of continuous cocurrent leaching at 25° C. The initial concentration of the hydrochloric acid is 6 mol/L, and the use ratio of the hydrochloric acid to the roasted concentrate is 1.0 mol of the hydrochloric acid/100 g of the rare earth concentrate. After solid-liquid separation, a leaching liquor of rare earth and a leach residue are collected respectively, and the content of the rare earth in the obtained leaching liquor of the rare earth is 238 g/L, the leaching rate of the rare earth is 77%, and the leaching rate of Ce is 70%.

In this step, the leaching with the hydrochloric acids preferably includes two or more steps of countercurrent leaching with the hydrochloric acids. In the first step, solid-liquid separation is performed after leaching with the hydrochloric acid to obtain a first-step leaching liquor of rare earth and a first-step leach residue. Next, the first-step leach residue is leached with the hydrochloric acid, and solid-liquid separation is performed to obtain a second-step leaching liquor of rare earth and a second-step leach residue, wherein the second-step leaching liquor of the rare earth is returned to be used as bottom water for leaching with the hydrochloric acid in the previous step; and next, the second-step leach residue is leached with the hydrochloric acid.

In this step, the hydrochloric acids are added in the way that 4 stages of continuous cocurrent leaching are carried out during the leaching, the concentrations of hydrochloric acids are controlled, 1.5 mol/L, 2 mol/L, 6 mol/L and 8 mol/L of the hydrochloric acids are respectively added in 1 to 4 stages, and the acidity of a mixed solution decreases gradually between 0.1-0.05 mol/L.

In this step, the leaching liquor of the rare earth is aged at 65° C. for 4 h. Solid-liquid separation is performed to obtain a rare earth chloride solution and a rare earth fluoride precipitate. The content of F in the rare earth chloride solution is 1.9 mg/L. The rare earth fluoride precipitate is dried to obtain a rare earth fluoride product.

(3) After the obtained leach residue is washed, dried and dehydrated till the moisture content is 9%, a concentrated sulfuric acid is added and roasting is performed at 300° C. for 3 h, wherein the mass ratio (w/w) of the concentrated sulphuric acid to the leach residue is controlled to be 0.3:1.

A roasted product is collected, added with water and leached with water at 25° C. for 4 h, and after neutralization for impurity removal, a 32 g/L rare earth sulfate solution is prepared. The total yield of the rare earth is 97%. The obtained rare earth sulfate solution is transformed by extraction to obtain a rare earth chloride solution, which is combined with the rare earth chloride solution in step (2). The combined solution is separated by extraction to obtain a single rare earth compound product.

In this step, sulfur-containing waste gas generated during the roasting with the sulfuric acid is recovered by means of water washing, spraying and absorbing to obtain a sulfuric acid product.

Embodiment 2

The rare earth concentrate processed by the process described in this embodiment is a bastnaesite and monazite mixed rare earth concentrate. The process for metallurgy and separating the rare earth concentrate by the combination method includes the following steps.

(1) The bastnaesite and monazite mixed rare earth concentrate is roasted under a low oxidizing air atmosphere (the content of oxygen is controlled to be 12% by adjusting the opening degree of an air inlet valve) at 500° C. for 4 h to obtain a roasted concentrate, wherein the opening degree of the air inlet valve is 50%.

In this step, HF that escapes during the roasting is sprayed with water for recovery.

(2) The obtained roasted concentrate is added with hydrochloric acids and subjected to 4 stages of continuous cocurrent leaching at 25° C. The initial concentration of the hydrochloric acid is 6 mol/L, and the use ratio of the hydrochloric acid to the roasted concentrate is 1.0 mol of the hydrochloric acid/100 g of the rare earth concentrate. After solid-liquid separation, a leaching liquor of rare earth and a leach residue are collected respectively, and the content of the rare earth in the obtained leaching liquor of the rare earth is 250 g/L, the leaching rate of the rare earth is 80%, and the leaching rate of Ce is 75%.

In this step, the leaching with the hydrochloric acids preferably includes two or more steps of countercurrent leaching with the hydrochloric acids. In the first step, solid-liquid separation is performed after leaching with the hydrochloric acid to obtain a first-step leaching liquor of rare earth and a first-step leach residue. Next, the first-step leach residue is leached with the hydrochloric acid, and solid-liquid separation is performed to obtain a second-step leaching liquor of rare earth and a second-step leach residue, wherein the second-step leaching liquor of the rare earth is returned to be used as bottom water for leaching with hydrochloric acid in the previous step; and next, the second-step leach residue is leached with the hydrochloric acid.

In this step, the hydrochloric acids are added in the way that 4 stages of continuous cocurrent leaching are carried out during the leaching, the concentrations of the hydrochloric acids are controlled, 1.5 mol/L, 2 mol/L, 6 mol/L and 8 mol/L of the hydrochloric acids are respectively added in 1 to 4 stages, and the acidity of a mixed solution decreases gradually between 0.1-0.05 mol/L.

In this step, the leaching liquor of the rare earth is aged at 80° C. for 4 h. Solid-liquid separation is performed to obtain a rare earth chloride solution and a rare earth fluoride precipitate. The content of F in the rare earth chloride solution is 1.2 mg/L. The rare earth fluoride precipitate is dried to obtain a rare earth fluoride product.

(3) After the obtained leach residue is washed, dried and dehydrated till the moisture content is 9%, the concentrated sulfuric acid is added and roasting is performed at 300° C. for 3 hours, wherein the mass ratio (w/w) of the concentrated sulphuric acid to the leach residue is controlled to be 0.3:1.

A roasted product is collected, added with water and leached with water at 25° C. for 4 h, and after neutralization for impurity removal, a 32 g/L rare earth sulfate solution is prepared. The total yield of the rare earth is 97%. The obtained rare earth sulfate solution is transformed by extraction to obtain a rare earth chloride solution, which is combined with the rare earth chloride solution in step (2). The combined solution is separated by extraction to obtain a single rare earth compound product.

In this step, sulfur-containing waste gas generated during the roasting with the sulfuric acid is recovered by means of water washing, spraying and absorbing to obtain a sulfuric acid product.

Embodiment 3

The rare earth concentrate processed by the process described in this embodiment is a bastnaesite and monazite mixed rare earth concentrate. The process for metallurgy and separating the rare earth concentrate by the combination method includes the following steps.

(1) The bastnaesite and monazite mixed rare earth concentrate is roasted under a water vapor atmosphere at 650° C. for 4 h to obtain a roasted concentrate, wherein the opening degree of an air inlet valve is 100%.

In this step, HF that escapes during the roasting is recovered by a rare earth oxide adsorbent to obtain a rare earth fluoride product.

(2) The obtained roasted concentrate is added with hydrochloric acids and subjected to 4 stages of continuous co-current leaching at 25° C. The initial concentration of the hydrochloric acid is 6 mol/L, and the use ratio of hydrochloric acid to the roasted concentrate is 1.0 mol of hydrochloric acid/100 g of the rare earth concentrate. After solid-liquid separation, a leaching liquor of rare earth and leach residue are collected respectively, and the content of rare earth in the obtained leaching liquor of rare earth is 235 g/L, the leaching rate of rare earth is 75%, and the leaching rate of Ce is 69%.

In this step, the leaching with the hydrochloric acids preferably includes two or more steps of countercurrent leaching with the hydrochloric acids. In the first step, solid-liquid separation is performed after leaching with the hydrochloric acid to obtain a first-step leaching liquor of rare earth and a first-step leach residue. Next, the first-step leach residue is leached with the hydrochloric acid, and solid-liquid separation is performed to obtain a second-step leaching liquor of rare earth and a second-step leach residue, wherein the second-step leaching liquor of the rare earth is returned to be used as bottom water for leaching with the hydrochloric acid in the previous step; and next, the second-step leach residue is leached with the hydrochloric acid.

In this step, the hydrochloric acids are added in the way that 4 stages of continuous cocurrent leaching are carried out during the leaching, the concentration of the hydrochloric acid is controlled, 1.5 mol/L, 2 mol/L, 6 mol/L and 8 mol/L of the hydrochloric acids are respectively added in 1 to 4 stages, and the acidity of a mixed solution decreases gradually between 0.1-0.05 mol/L.

In this step, the leaching liquor of the rare earth is aged at 80° C. for 4 h. Solid-liquid separation is performed to obtain a rare earth chloride solution and a rare earth fluoride precipitate. The content of F in the rare earth chloride solution is 1.5 mg/L. The rare earth fluoride precipitate is dried to obtain a rare earth fluoride product.

(3) After the obtained leach residue is washed, dried and dehydrated till the moisture content is 9%, the concentrated sulfuric acid is added and roasting is performed at 300° C. for 3 hours, wherein the mass ratio (w/w) of the concentrated sulphuric acid to the leach residue is controlled to be 0.3:1.

A roasted product is collected, added with water and leached with water at 25° C. for 4 hours, and after neutralization for impurity removal, a 32 g/L rare earth sulfate solution is prepared. The total yield of the rare earth is 95%. The obtained rare earth sulfate solution is transformed by extraction to obtain a rare earth chloride solution, which is combined with the rare earth chloride solution in step (2). The combined solution is separated by extraction to obtain a single rare earth compound product.

In this step, sulfur-containing waste gas generated during the roasting with the sulfuric acid is recovered by means of water washing, spraying and absorbing to obtain a sulfuric acid product.

The steps of Embodiments 4 to 23 are as shown in Embodiments 1 to 3. The conditions of each step are as shown in Tables 2 to 4 below. The final total yields of rare earth are as shown in Table 4.

TABLE 2

| | | Step 1 | | | |
|---|---|---|---|---|---|
| Serial number of embodiment | Type of mineral | Atmosphere | Roasting temperature ° C. | Roasting time h | Treatment of fluorine-containing tail gas |
| Embodiment 4 | Bastnaesite and monazite | Low oxidizing air atmosphere (oxygen content 12%) | 400 | 4 | Water spray |
| Embodiment 5 | Bastnaesite and monazite | Low oxidizing air atmosphere (oxygen content 12%) | 500 | 0.5 | Water spray |
| Embodiment 6 | Bastnaesite and monazite | Low oxidizing air atmosphere (oxygen content 12%) | 500 | 4 | Water spray |
| Embodiment 7 | Bastnaesite and monazite | Low oxidizing air atmosphere (oxygen content 12%) | 500 | 4 | Water spray |
| Embodiment 8 | Bastnaesite and monazite | Low oxidizing air atmosphere (oxygen content 12%) | 500 | 4 | Water spray |
| Embodiment 9 | Bastnaesite and monazite | Low oxidizing air atmosphere (oxygen content 18%) | 500 | 4 | Water spray |
| Embodiment 10 | Bastnaesite and monazite | Low oxidizing air atmosphere (oxygen content 8%) | 500 | 4 | Water spray |
| Embodiment 11 | Bastnaesite and monazite | Low oxidizing air atmosphere (oxygen content 12%) | 500 | 2 | Water spray |
| Embodiment 12 | Bastnaesite and monazite | Low oxidizing air atmosphere (oxygen content 12%) | 500 | 4 | Water spray |
| Embodiment 13 | Bastnaesite and monazite | Low oxidizing air atmosphere (oxygen content 12%) | 500 | 4 | Water spray |
| Embodiment 14 | Bastnaesite and monazite | Low oxidizing air atmosphere (oxygen content 12%) | 500 | 4 | Water spray |
| Embodiment 15 | Bastnaesite and monazite | Low oxidizing air atmosphere (oxygen content 12%) | 500 | 4 | Water spray |
| Embodiment 16 | Bastnaesite | Water vapor and air mixed gas | 450 | 3 | Adsorption with a rare earth dehydrated oxide |
| Embodiment 17 | Mixed rare earth concentrate in Baotou | Water vapor and CO mixed gas | 600 | 4 | Adsorption with a rare earth oxide |
| Embodiment 18 | Mixed rare earth concentrate in Baotou | Low oxidizing air atmosphere (oxygen content 12%) | 650 | 3 | Spraying with liquid alkali |
| Embodiment 19 | Bastnaesite and xenotime | Air and $CO_2$ mixed gas | 350 | 4 | Water spray |
| Embodiment 20 | Bastnaesite, monazite and xenotime | Water vapor and $N_2$ mixed gas | 500 | 6 | Adsorption with a rare earth dehydrated oxide |
| Embodiment 21 | Bastnaesite and monazite | Water vapor and $CO_2$ mixed gas | 400 | 3 | Adsorption with a rare earth oxide |
| Embodiment 22 | Bastnaesite and apatite | Water vapor and air mixed gas | 500 | 3 | Adsorption with rare earth dehydrated oxide |
| Embodiment 23 | Bastnaesite | CO and $CO_2$ mixed gas | 450 | 4 | Water spray |

TABLE 3

| Serial number of embodiment | Type of mineral | One or more steps of leaching | Leaching temperature °C | Concentration of hydrochloric acid mol/L | Acid-ore ratio mol hydrochloric acid/100 g rare earth concentrate | Content of rare earth in leaching liquor g/L | Leaching rate of rare earth % | Leaching rate of Ce % | Number of stage for continuous cocurrent leaching | Step 2 First stage of acidity increase mol/L | Second stage of acidity increase mol/L | Third stage of acidity increase mol/L | Fourth stage of acidity increase mol/L | Fifth stage of acidity increase mol/L | Maintaining acidity of mixed liquid mol/L | Aging temperature °C | Aging time h | Content of F in rare earth chloride mg/L |
|---|---|---|---|---|---|---|---|---|---|---|---|---|---|---|---|---|---|---|
| Embodiment 4 | Bastnaesite and monazite | Yes | 25 | 6 | 1.0 | 210 | 72 | 71 | 4 | 1.5 | 2 | 6 | 8 | | 0.1-0.05 | 80 | 4 | 1.4 |
| Embodiment 5 | Bastnaesite and monazite | Yes | 25 | 6 | 1.0 | 190 | 71 | 62 | 4 | 1.5 | 2 | 6 | 8 | | 0.1-0.05 | 80 | 4 | 1.5 |
| Embodiment 6 | Bastnaesite and monazite | No | 25 | 6 | 1.0 | 218 | 74 | 69 | 4 | 1.5 | 2 | 6 | 8 | | 0.1-0.05 | 80 | 4 | 1.2 |
| Embodiment 7 | Bastnaesite and monazite | Yes | 40 | 6 | 1.0 | 215 | 72 | 62 | 4 | 1.5 | 2 | 6 | 8 | | 0.1-0.05 | 80 | 4 | 2 |
| Embodiment 8 | Bastnaesite and monazite | Yes | 25 | 6 | 1.0 | 202 | 75 | 61 | 4 | 1.5 | 2 | 6 | 8 | | 0.1-0.05 | 80 | 4 | 1.8 |
| Embodiment 9 | Bastnaesite and monazite | Yes | 25 | 6 | 1.0 | 243 | 78 | 73 | 4 | 1.5 | 2 | 6 | 8 | | 0.3-0.2 | 80 | 4 | 1.5 |
| Embodiment 10 | Bastnaesite and monazite | Yes | 25 | 6 | 1.0 | 250 | 81 | 76 | 4 | 1.5 | 2 | 6 | 8 | | 0.1-0.05 | 80 | 4 | 1.2 |
| Embodiment 11 | Bastnaesite and monazite | Yes | 25 | 6 | 1.0 | 230 | 75 | 69 | 4 | 1.5 | 2 | 6 | 8 | | 0.1-0.05 | 80 | 4 | 1.4 |
| Embodiment 12 | Bastnaesite and monazite | Yes | 65 | 6 | 1.0 | 195 | 70 | 60 | 4 | 1.5 | 2 | 6 | 8 | | 0.1-0.05 | 80 | 4 | 2.5 |
| Embodiment 13 | Bastnaesite and monazite | Yes | 25 | 6 | 1.0 | 250 | 77 | 68 | 4 | 1.5 | 2 | 6 | 8 | | 0.1-0.05 | 80 | 4 | 1.6 |
| Embodiment 14 | Bastnaesite and monazite | Yes | 25 | 6 | 1.0 | 250 | 80 | 75 | 4 | 1.5 | 2 | 6 | 8 | | 0.2-0.1 | 80 | 2 | 2.2 |
| Embodiment 15 | Bastnaesite and monazite | Yes | 25 | 6 | 1.0 | 250 | 80 | 75 | 4 | 1.5 | 2 | 6 | 8 | | 0.1-0.05 | 80 | 4 | 1.2 |
| Embodiment 16 | Bastnaesite | No | 25 | 3.5 | 0.7 | 186 | 90 | 89 | 3 | 2 | 4 | 6 | | | 0.1-0.05 | 65 | 3 | 2.3 |
| Embodiment 17 | Mixed rare earth concentrate in Baotou | Yes | 10 | 4 | 1.5 | 150 | 70 | 60 | 5 | 1.6 | 2.2 | 4.2 | 5.8 | 7.5 | 0.6-0.5 | 60 | 2 | 4.5 |

TABLE 3-continued

| Serial number of embodiment | Type of mineral | One or more steps of leaching | Leaching temperature °C. | Concentration of hydrochloric acid mol/L | Acid-ore ratio mol hydrochloric acid/100 g rare earth concentrate | Content of rare earth in leaching liquor g/L | Leaching rate of rare earth % | Leaching rate of Ce % | Number of stage for continuous cocurrent leaching | First stage of acidity increase mol/L | Second stage of acidity increase mol/L | Third stage of acidity increase mol/L | Fourth stage of acidity increase mol/L | Fifth stage of acidity increase mol/L | Maintaining acidity of mixed liquid mol/L | Aging temperature °C. | Aging time h | Content of F in rare earth chloride mg/L |
|---|---|---|---|---|---|---|---|---|---|---|---|---|---|---|---|---|---|---|
| | | | | | | | | | Step 2 | | | | | | | | | |
| Embodiment 18 | Mixed rare earth concentrate in Baotou | Yes | 20 | 10 | 1.2 | 170 | 71 | 62 | 4 | 2 | 3 | 4 | 6 | | 0.4-0.3 | 90 | 3 | 1.5 |
| Embodiment 19 | Bastnaesite and xenotime | No | 30 | 7 | 2.0 | 195 | 75 | 73 | 3 | 2 | 4 | 7 | | | 0.6-0.55 | 80 | 3 | 1.1 |
| Embodiment 20 | Bastnaesite, monazite and xenotime | Yes | 55 | 5 | 0.4 | 180 | 70 | 65 | 3 | 3 | 5 | 8 | | | 0.1-0.02 | 70 | 1 | 7.5 |
| Embodiment 21 | Bastnaesite and monazite | Yes | 40 | 4 | 0.9 | 245 | 76 | 69 | 4 | 3 | 4 | 6 | 8 | | 0.2-0.1 | 70 | 5 | 1.5 |
| Embodiment 22 | Bastnaesite and apatite | No | 75 | 4 | 0.9 | 199 | 65 | 60 | 3 | 2 | 5 | 7 | | | 0.15-0.05 | 90 | 3 | 5.6 |
| Embodiment 23 | Bastnaesite | No | 25 | 3 | 1.9 | 152 | 95 | 95 | 2 | 3 | 5 | | | | 0.1-0.05 | 80 | 2 | 2.3 |

TABLE 4

| Serial number of embodiment | Type of mineral | Moisture content of dehydrated leach residue % | Roasting temperature ° C. | Roasting time h | Acid-ore ratio w/w | Temperature for leaching with water ° C. | Time for leaching with water h | Concentration of rare earth sulfate solution g/L | Total yield of rare earth % |
|---|---|---|---|---|---|---|---|---|---|
| | | | Step 3 | | | | | | |
| Embodiment 4 | Bastnaesite and monazite | 9 | 300 | 3 | 0.5:1 | 25 | 4 | 30 | 95 |
| Embodiment 5 | Bastnaesite and monazite | 9 | 230 | 4 | 0.4:1 | 28 | 5 | 25 | 90 |
| Embodiment 6 | Bastnaesite and monazite | 9 | 300 | 3 | 0.4:1 | 25 | 4 | 32 | 94 |
| Embodiment 7 | Bastnaesite and monazite | 8 | 250 | 3 | 0.5:1 | 30 | 4 | 30 | 95 |
| Embodiment 8 | Bastnaesite and monazite | 8 | 300 | 4 | 0.6:1 | 25 | 4 | 27 | 95 |
| Embodiment 9 | Bastnaesite and monazite | 9 | 300 | 3 | 0.3:1 | 25 | 4 | 32 | 97 |
| Embodiment 10 | Bastnaesite and monazite | 9 | 300 | 3 | 0.3:1 | 25 | 4 | 32 | 98 |
| Embodiment 11 | Bastnacsite and monazite | 9 | 300 | 3 | 0.4:1 | 25 | 4 | 30 | 95 |
| Embodiment 12 | Bastnaesite and monazite | 8 | 250 | 3 | 0.5:1 | 30 | 4 | 29 | 94 |
| Embodiment 13 | Bastnaesite and monazite | 9 | 300 | 3 | 0.3:1 | 25 | 4 | 31 | 96 |
| Embodiment 14 | Bastnaesite and monazite | 9 | 300 | 3 | 0.3:1 | 25 | 4 | 32 | 97 |
| Embodiment 15 | Bastnaesite and monazite | 9 | 300 | 3 | 0.3:1 | 40 | 4 | 28 | 92 |
| Embodiment 16 | Bastnaesite | 9 | 200 | 4 | 0.4:1 | 35 | 3 | 26 | 94 |
| Embodiment 17 | Mixed rare earth concentrate in Baotou | 8 | 350 | 3 | 1.2:1 | 40 | 2 | 28 | 92 |
| Embodiment 18 | Mixed rare earth concentrate in Baotou | 9 | 450 | 1 | 0.5:1 | 50 | 3 | 45 | 96 |
| Embodiment 19 | Bastnaesite and xenotime | 9 | 300 | 4 | 0.3:1 | 40 | 4 | 31 | 96 |
| Embodiment 20 | Bastnaesite, monazite and xenotime | 8 | 400 | 3 | 0.4:1 | 32 | 3 | 30 | 95 |
| Embodiment 21 | Bastnaesite and monazite | 10 | 350 | 2 | 0.4:1 | 35 | 4 | 31 | 97 |
| Embodiment 22 | Bastnaesite and apatite | 9 | 400 | 3 | 0.8:1 | 20 | 3 | 33 | 95 |
| Embodiment 23 | Bastnaesite | 8 | 400 | 4 | 0.5:1 | 38 | 3 | 32 | 96 |

It thus can be seen that a variety of complex rare earth minerals can be comprehensively processed through the process provided by the present invention, and the whole process has a wider industrial applicability. Most fluorine is converted into HF gas to enter tail gas by roasting under the atmosphere, and the fluorine-containing product is prepared by means of adsorption and recovery. Through multiple stages of continuous leaching with the hydrochloric acids and adjustment and control of the acidity, a high-concentration rare earth chloride solution (150-250 g/L REO) is obtained. Meanwhile, the leaching rate of the rare earth reaches more than 70%. The content of F in the leaching liquor is reduced by aging, and the rare earth fluoride product is obtained to prevent fluorine from entering the leach residue. Thus, the problem that the fluorine-containing and sulfur-containing mixed tail gas during the roasting with a sulfuric acid is difficult to process is solved. Rare earth in the leach residue is further recovered by roasting with the sulfuric acid and leaching with water, and the total yield of the rare earth reaches more than 95%. Environmentally friendly, efficient and clean production of such mineral-type rare earth concentrates is realized.

Obviously, the foregoing embodiments are merely examples for clear description, and are not limitations to the implementations. For those of ordinary skill in the art, other different forms of changes or modifications may be made based on the above description. There is no need and it is also impossible to list all the implementations herein. All obvious changes or variations derived therefrom are still within the scope of protection of the present invention.

The invention claimed is:

1. A process for metallurgy and separating a rare earth concentrate using a combination method, the process comprising:
    (1) decomposing the rare earth concentrate by roasting under a certain roasting atmosphere to obtain a roasted concentrate, wherein the roasting atmosphere during the roasting includes one or more of a water vapor atmosphere, $N_2$, CO, $CO_2$, air, and inert gases;
    (2) adding the roasted concentrate with a hydrochloric acid to leach rare earth, and collecting a leaching liquor of rare earth and a leach residue respectively after solid-liquid separation; and (3) dehydrating the leach residue, then adding the dehydrated leach residue with a concentrated sulfuric acid, roasting, collecting a roasted product, leaching the roasted product with water, and neutralizing to remove impurities to obtain a rare earth sulfate solution, and separating the obtained rare earth sulfate solution by extraction, or transforming the obtained rare earth sulfate solution by extraction or transforming the obtained rare earth sulfate solution by precipitation to obtain a rare earth chloride solution;

wherein in step (2), the obtained leaching liquor of the rare earth is aged at 60° C. to 90° C. for 1 to 5 hours, and solid-liquid separation is performed to obtain a rare earth chloride solution and a rare earth fluoride powder product; and the obtained rare earth chloride solution is combined with the rare earth chloride solution obtained by transforming the rare earth sulfate solution in step (3), and separating the combined solution by extraction to obtain a single rare earth compound.

2. The process for metallurgy and separating the rare earth concentrate using the combination method according to claim 1, wherein in step (1), the roasting is at a roasting temperature of 350° C. to 650° C.

3. The process for metallurgy and separating the rare earth concentrate using the combination method according to claim 1, wherein in step (2), the leaching with the hydrochloric acid preferably comprises two or more steps of countercurrent leaching with hydrochloric acids, wherein in the first step, solid-liquid separation is performed after leaching with the hydrochloric acid to obtain a first-step leaching liquor of rare earth and a first-step leach residue, and next, the first-step leach residue is leached with the hydrochloric acid, and solid-liquid separation is performed to obtain a second-step leaching liquor of rare earth and a second-step leach residue, wherein the second-step leaching liquor of the rare earth is returned to be used as bottom water for leaching with the hydrochloric acid in the previous step, and next, the second-step leach residue is leached with the hydrochloric acid.

4. The process for metallurgy and separating the rare earth concentrate using the combination method according to claim 1, wherein in step (2), the hydrochloric acids are added in the way that 2 to 5 stages of continuous cocurrent leaching are carried out during the leaching, and hydrochloric acids are controlled to be added in a concentration gradient during each stage of leaching to keep the acidity of a mixed solution at 0.01 mol/L to 0.6 mol/L during the leaching.

5. The process for metallurgy and separating the rare earth concentrate using the combination method according to claim 1, wherein in step (2), a leaching temperature during the leaching with the hydrochloric acids is controlled to be 10° C. to 75° C.

6. The process for metallurgy and separating the rare earth concentrate using the combination method according to claim 1, wherein in step (3), a mass ratio (w/w) of the concentrated sulfuric acid to the dehydrated leach residue is (0.3 to 1.2):1.

7. The process for metallurgy and separating the rare earth concentrate using the combination method according to claim 1, wherein in step (3), the roasting with the sulfuric acid is at a temperature of 200° C. to 450° C., and the leaching with water is at a temperature of 20° C. to 50° C.

8. The process for metallurgy and separating the rare earth concentrate using the combination method according to claim 1, wherein step (3) further comprises: separating the rare earth chloride solution by extraction to obtain a single rare earth compound.

9. The process for metallurgy and separating the rare earth concentrate using the combination method according to claim 1, wherein water or an alkaline liquid is sprayed onto fluorine-containing tail gas generated during the roasting in step (1) or defluorination is performed on the fluorine-containing tail gas using one or two adsorbents of a rare earth oxide and a rare earth hydrated oxide to recover a rare earth fluoride product; and sulfur-containing tail gas generated in the roasting with the sulfuric acid in step (3) is desulfurized and recycled to obtain a sulfuric acid product.

10. The process for metallurgy and separating the rare earth concentrate using the combination method according to claim 2, wherein in step (2), the leaching with the hydrochloric acid preferably comprises two or more steps of countercurrent leaching with hydrochloric acids, wherein in the first step, solid-liquid separation is performed after leaching with the hydrochloric acid to obtain a first-step leaching liquor of rare earth and a first-step leach residue, and next, the first-step leach residue is leached with the hydrochloric acid, and solid-liquid separation is performed to obtain a second-step leaching liquor of rare earth and a second-step leach residue, wherein the second-step leaching liquor of the rare earth is returned to be used as bottom water for leaching with the hydrochloric acid in the previous step, and next, the second-step leach residue is leached with the hydrochloric acid.

11. The process for metallurgy and separating the rare earth concentrate using the combination method according to claim 2, wherein in step (2), the hydrochloric acids are added in the way that 2 to 5 stages of continuous cocurrent leaching are carried out during the leaching, and hydrochloric acids are controlled to be added in a concentration gradient during each stage of leaching to keep the acidity of a mixed solution at 0.01 mol/L to 0.6 mol/L during the leaching.

12. The process for metallurgy and separating the rare earth concentrate using the combination method according to claim 2, wherein in step (2), a leaching temperature during the leaching with the hydrochloric acids is controlled to be 10° C. to 75° C.

13. The process for metallurgy and separating the rare earth concentrate using the combination method according to claim 3, wherein in step (2), a leaching temperature during the leaching with the hydrochloric acids is controlled to be 10° C. to 75° C.

14. The process for metallurgy and separating the rare earth concentrate using the combination method according to claim 4, wherein in step (2), a leaching temperature during the leaching with the hydrochloric acids is controlled to be 10° C. to 75° C.

* * * * *